United States Patent
Bang et al.

(10) Patent No.: US 7,453,534 B2
(45) Date of Patent: *Nov. 18, 2008

(54) LIQUID CRYSTAL DISPLAY PANEL

(75) Inventors: Yong Ik Bang, Taegu-Kwangyokshi (KR); Dong Yeung Kwak, Taegu-Kwangyokshi (KR); Sung Il Park, Kyonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/002,418

(22) Filed: Dec. 3, 2004

(65) Prior Publication Data

US 2005/0099552 A1    May 12, 2005

Related U.S. Application Data

(63) Continuation of application No. 10/025,904, filed on Dec. 26, 2001, now Pat. No. 6,900,860.

(30) Foreign Application Priority Data

Dec. 22, 2000   (KR) ................. 2000-80214

(51) Int. Cl.
    *G02F 1/1333*   (2006.01)
(52) U.S. Cl. ....................................... 349/110

(58) Field of Classification Search ........... None
See application file for complete search history.

(56) References Cited

U.S. PATENT DOCUMENTS

| | | | |
|---|---|---|---|
| 5,513,028 A | 4/1996 | Sono et al. | 349/139 |
| 5,877,830 A | 3/1999 | Shimada et al. | 349/110 |
| 6,204,895 B1 | 3/2001 | Nakamura et al. | 349/5 |
| 6,300,987 B1 * | 10/2001 | Jung | 349/39 |
| 6,587,161 B1 * | 7/2003 | Yamamoto et al. | 349/43 |
| 6,900,860 B2 * | 5/2005 | Bang et al. | 349/110 |
| 7,123,315 B2 * | 10/2006 | Bang et al. | 349/44 |

* cited by examiner

*Primary Examiner*—Timothy Rude
(74) *Attorney, Agent, or Firm*—McKenna Long & Aldridge LLP

(57) ABSTRACT

A liquid crystal display (LCD) panel that has even luminance with high picture quality is disclosed. The LCD panel includes a first substrate provided with a plurality of gate and data lines, the gate lines being arranged to cross the data lines to define a plurality of pixel regions in a matrix arrangement; a second substrate provided with a black matrix layer to shield portions other than the pixel region from light; and a liquid crystal layer injected between the first and second substrates, wherein the pixel regions at a surrounding portion have an aperture ratio lower than that of the pixel regions at the other portions.

4 Claims, 13 Drawing Sheets

LIQUID CRYSTAL DISPLAY PANEL

This application is a Continuation of prior application Ser. No. 10/025,904, filed Dec. 26, 2001 now U.S. Pat. No. 6,900,860.

This application claims the benefit of Korean Patent Application No. 2000-80214 filed on Dec. 22, 2000, which is hereby incorporated by reference as if fully set forth herein.

BACKGROUND OF THE INVENTION

1. Field of the Invention

The present invention relates to a liquid crystal display (LCD) device, and more particularly, to an LCD panel that prevents luminance occurring in a contour of a cell region from being higher than that occurring in the cell region, thereby improving picture quality.

2. Discussion of the Related Art

Rapid development within the fields of information and communication has caused an increase in the demand for thin, lightweight and low cost display devices for viewing information. Industries that develop displays are responding to these needs by placing high emphasis on developing flat panel type displays.

Historically, the Cathode Ray Tube (CRT) has been widely used as a display device in applications such as televisions, computer monitors, and the like, because CRT screens can display various colors with high luminance. However, the CRT cannot adequately satisfy present demands for display applications that require reduced volume and weight, portability, and low power consumption, while having a large screen size and high resolution. Out of this need, the display industry has placed high emphasis on developing flat panel displays to replace the CRT. Over the years, flat panel displays have found wide use in monitors for computers, spacecraft, and aircraft. Examples of flat panel display types currently used include the LCD, the electroluminescent display (ELD), the field emission display (FED), and the plasma display panel (PDP).

Characteristics required for an ideal flat panel display include a lightweight, high luminance, high efficiency, high resolution, high speed response time, low driving voltage, low power consumption, low cost, and natural color.

Generally, a phosphor material on a surface of the CRT emits light in an analog type based on an externally applied display timing signal and an externally applied data signal, so that a trace of an electron beam is controlled. On the other hand, the LCD controls the electric field applied to the liquid crystal located in each display so that transmittivity of light is controlled.

Development and application of thin film transistor (TFT)-LCD industries have been accelerated in accordance with the increase in the dimensions and increase in the resolution. To increase the productivity, many efforts have been focused on simplifying process steps and improving yield.

A related art LCD panel is now described with reference to FIG. 1.

FIG. 1 is a plan view illustrating a related art LCD panel.

As shown in FIG. 1, a plurality of gate lines G1, G2, ..., Gn are arranged to cross a plurality of data lines D1, D2, ..., Dn, so that a plurality of pixel regions are defined. A TFT is formed at each crossing point between the respective gate line and the respective data line. A pixel electrode 15 is formed in each pixel region.

The TFT includes a gate electrode 11 extending from the gate lines, a gate insulating film (not shown) over the gate electrode, a semiconductor layer 12 on the gate insulating film, and source and drain electrodes 13 and 14 on the semiconductor layer 12.

All the gate lines G1, ..., Gn have substantially the same widths as one another. All the data lines D1, ..., Dn also have substantially the same widths as one another.

A pixel electrode 15 including a transparent conductive material such as indium tin oxide (ITO) is formed in each pixel region. Each pixel electrode 15 has the same aperture ratio over the entire region of the panel.

As shown in FIG. 1, no pixel electrode is formed above the first gate line G1. Likewise, no pixel electrode is formed before the first data line D1 and the nth data line Dn.

The process for fabricating the aforementioned related art LCD panel will now be described with reference to FIG. 2A to FIG. 2C.

As shown in FIG. 2A, a gate electrode material, such as Al, Cr, Mo, Ta, and Al alloy, is formed on an insulating substrate by a sputtering process and then is patterned, so that the plurality of gate lines G1, G2, ..., Gn having the gate electrode 11 are formed to have substantially the same widths.

Afterwards, the gate insulating film (not shown) of $SiN_X$ or $SiO_X$ is formed on the entire surface including the gate lines G1, G2, ..., Gn. As shown in FIG. 2B, a semiconductor layer 12 used as a channel of the TFT is patterned on the gate insulating film over the gate electrode 11.

Subsequently, the plurality of data lines D1, D2, ..., Dn are formed to cross the gate lines G1, G2, ..., Gn. At the same time, the source and drain electrodes 13 and 14 are formed over the semiconductor layer 12. At this time, the data lines D1, D2, ..., , ..., Dn have substantially the same width over the whole region of the panel.

As shown in FIG. 2C, a passivation film (not shown) is formed on the entire surface including the data lines D1, D2, ..., Dn and the source and drain electrodes 13 and 14. A contact hole is then formed to expose the drain electrode 14. The pixel electrode 15 is formed to electrically connect with the drain electrode 14 through the contact hole.

At this time, since the respective pixel electrodes 15 have substantially the same area as one another over the whole region of the panel, they have the same aperture ratio as each other.

Thus, a TFT substrate is manufactured.

Although not shown, the TFT substrate and an opposing color filter substrate are prepared and attached to each other. A liquid crystal is then injected between the two substrates. Thus, the process for manufacturing the related art LCD panel is completed.

However, the related art LCD panel has several problems.

Since no electrode (pixel electrode) is formed before the first data line, after the last data line, or above the gate line, the electric field does not occur therein. Accordingly, in view of the whole region of the panel, the electric field intensity varies depending on the portion where the pixel electrode is formed and the portion where the pixel electrode is not formed, thereby causing difference in transmittivity therebetween.

According to the experiments, the transmittivity difference between the portion where the pixel electrode is formed and the portion where the pixel electrode is not formed is about 12%. Accordingly, luminance occurring before the first data line, after the last data line, or above the gate line is higher than that at the other portions. For this reason, picture quality is deteriorated.

SUMMARY OF THE INVENTION

Accordingly, the present invention is directed to an LCD panel that substantially obviates one or more of the problems due to limitations and disadvantages of the related art.

An object of the present invention is to provide an LCD panel that has even luminance with high picture quality.

Additional features and advantages of the invention will be set forth in the description that follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages in accordance with the present invention, as embodied and broadly described, a liquid crystal display panel includes a first substrate provided with a plurality of gate and data lines, the gate lines being arranged to cross the data lines to define a plurality of pixel regions in a matrix arrangement; a second substrate provided with a black matrix layer to shield portions other than the pixel regions from light; and a liquid crystal layer injected between the first and second substrates, wherein the pixel regions in a peripheral portion of the matrix arrangement have an aperture ratio lower than that of the pixel region at the other portions in the matrix arrangement.

A first gate line among the gate lines has a greater width than widths of the other gate lines, and a first data line or a last data line among the data lines has a greater width than widths of the other data lines.

The black matrix layer corresponding to the first gate line, the first data line or the last data line has a greater width than widths of the black matrix layer corresponding to the other portions.

A light-shielding pattern is further provided in the pixel regions in the peripheral portion, and the pixel regions in the peripheral portion have an aperture ratio reduced by 10~15% more than aperture ratios of the pixel region at the other portions.

In another aspect of the present invention, a liquid crystal display panel includes a plurality of gate lines arranged in one direction at constant intervals; a plurality of data lines arranged at constant intervals to be substantially perpendicular to the gate lines to define a plurality of pixel regions in a matrix arrangement; and a plurality of pixel electrodes, wherein one pixel electrode is in each pixel region, wherein the pixel electrodes at a peripheral portion of the matrix arrangement are narrower than the pixel electrode at the other portions.

A gate line that does not drive the pixel electrode among the gate lines has a greater width than widths of the other gate lines. A first data line or a last data line among the data lines has a greater width than widths of the other data lines. The pixel electrodes adjacent to the first data line or the last data line have a smaller area than areas of the other pixel electrodes.

In still another aspect of the present invention, a liquid crystal display panel according to the present invention includes a first substrate provided with a plurality of gate and data lines, the gate lines being arranged to cross the data lines to define a plurality of pixel regions in a matrix arrangement; a second substrate provided with a black matrix layer to shield portions other than the pixel regions from light; and a liquid crystal layer injected between the first and second substrates, wherein the black matrix layer corresponding to a first data line or a last data line among the data lines has a greater width than the black matrix layer corresponding to the other lines.

The black matrix layer corresponding to a first gate line among the gate lines has a greater width than the black matrix layer corresponding to the other gate lines.

In further another aspect of the present invention, a liquid crystal display panel includes a plurality of gate lines arranged in one direction at constant intervals; a plurality of data lines arranged at constant intervals to be substantially perpendicular to the gate lines to define a plurality of pixel regions in a matrix arrangement; and a plurality of light-shielding patterns in at least one of the pixel regions at a surrounding portion among the pixel regions.

The light-shielding patterns are in the pixel regions adjacent to a first data line or a last data line among the data lines. The light-shielding patterns are a metal which is the same material as that of the data lines.

In further still another aspect of the present invention, an LCD panel includes: first and second substrates; a plurality of gate and data lines arranged on the first substrate to define a plurality of pixel regions, the gate lines crossing the data lines; a plurality of pixel electrodes, wherein one pixel electrode is in each pixel region; and a black matrix pattern formed on the second substrate to shield portions other than the pixel electrodes from light, wherein a first gate line among the gate lines has a greater width than the other gate lines, one of a first data line and a last data line among the data lines has a width greater than the other data lines, and the black matrix pattern corresponding to the first gate line, the first data line or the last data line has a width greater than the black matrix pattern corresponding to the other portions.

A plurality of thin film transistors are further provided in a crossing portion of the respective gate line and the respective data line.

The pixel electrodes adjacent to the first data line and/or the last data line have smaller area than the other pixel electrodes.

The pixel electrodes adjacent to the first data line and the last data line have an aperture ratio reduced by 10~15% of aperture ratios of the other pixel electrodes.

In the LCD panel of the present invention, to remove relatively high luminance caused because a region where a pixel electrode is not formed has higher transmittivity than that of a region where a pixel electrode is formed, an aperture ratio in a region of the pixel electrode adjacent to where the pixel electrode is not formed is reduced so that even luminance distribution can be obtained.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
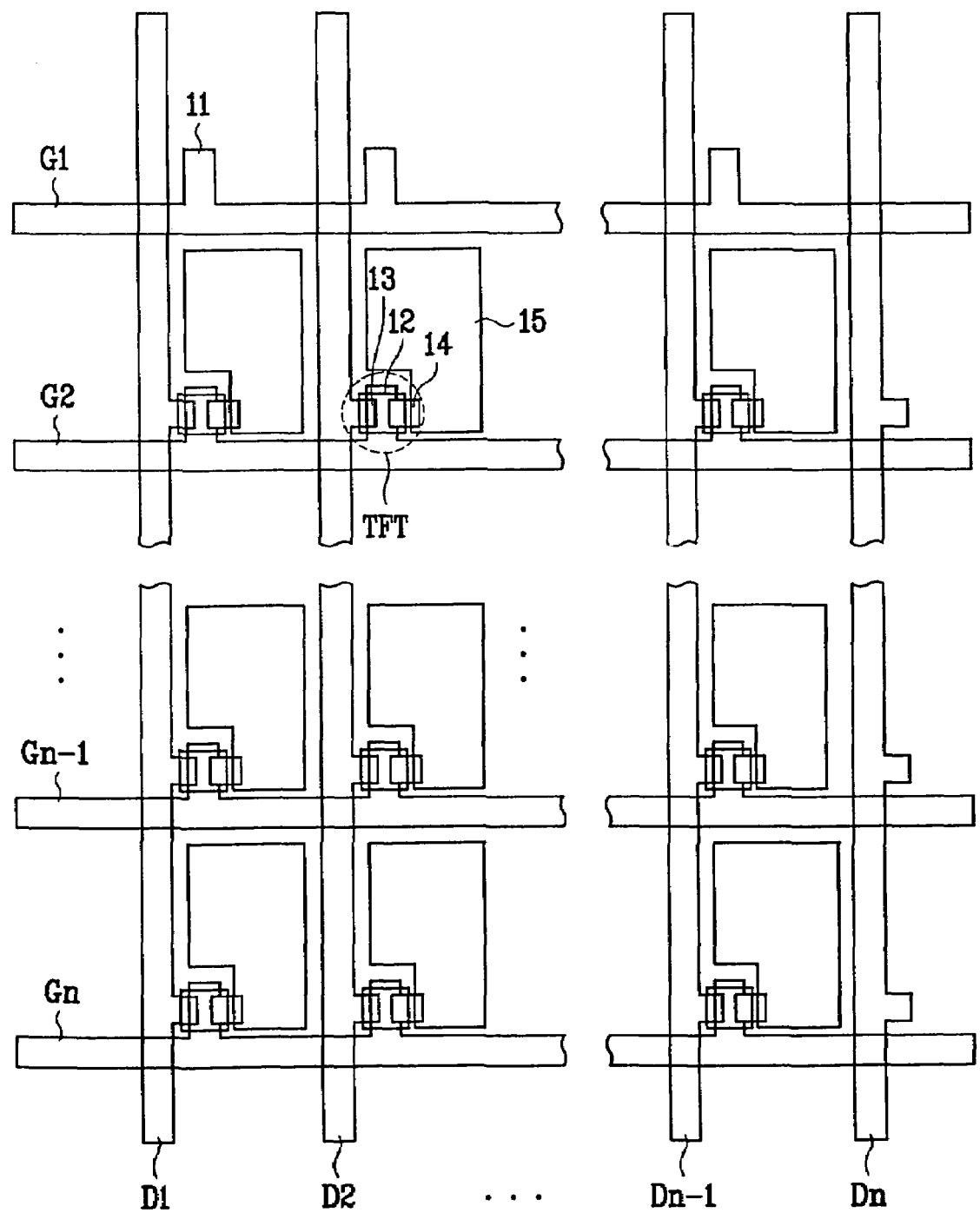
FIG. 1 is a plan view illustrating a related art LCD panel.
Figure 2A:
FIG. 2 is a cross-sectional view illustrating a related art method for fabricating an LCD panel.
Figure 2A:
Figure 2A:
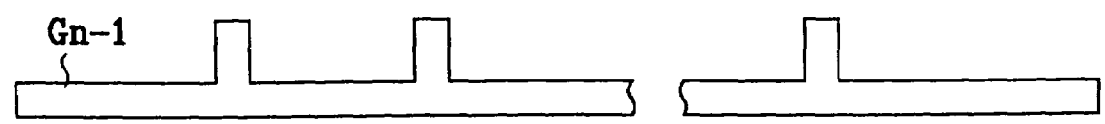
Figure 2A:
Figure 2B:
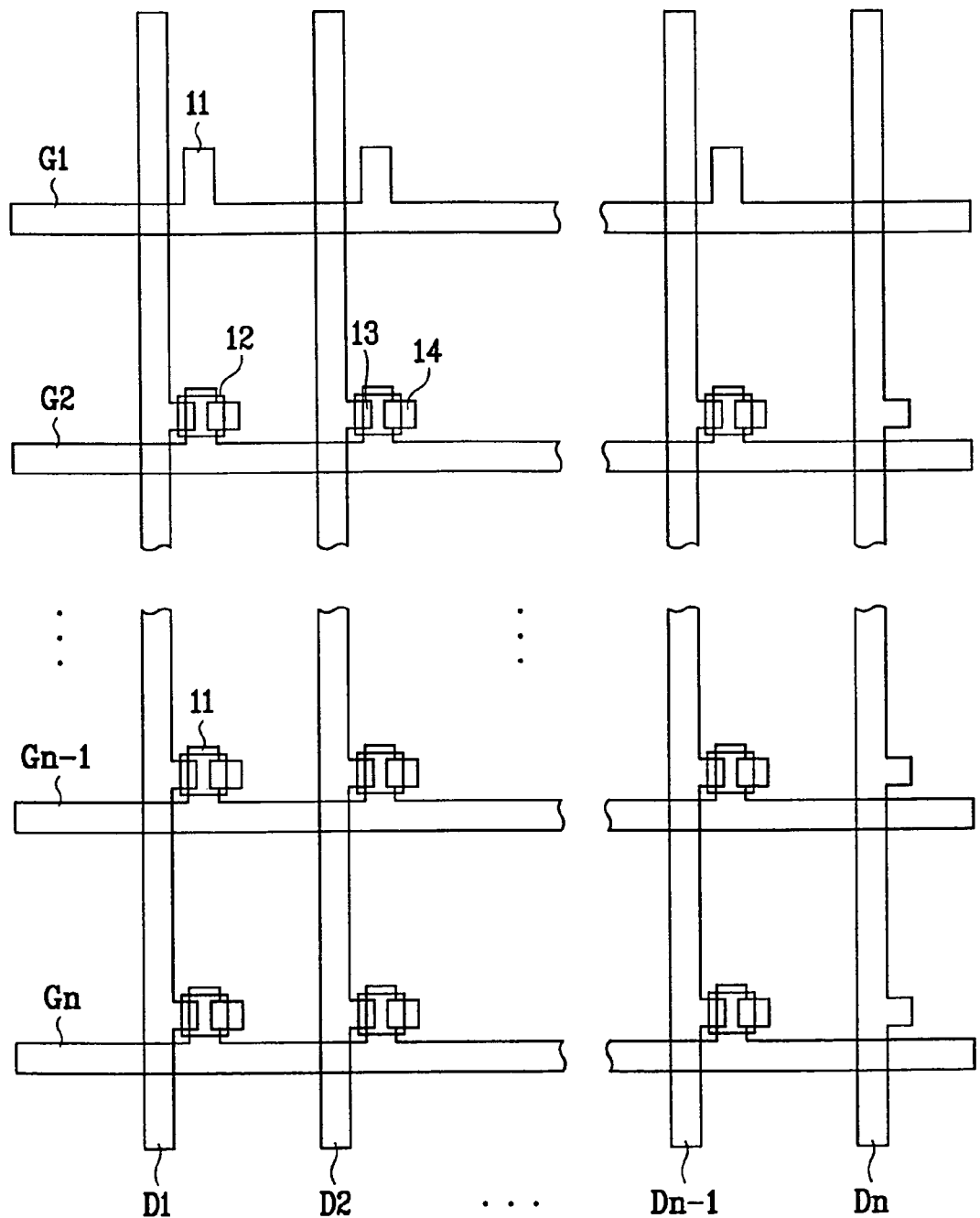
Figure 2C:
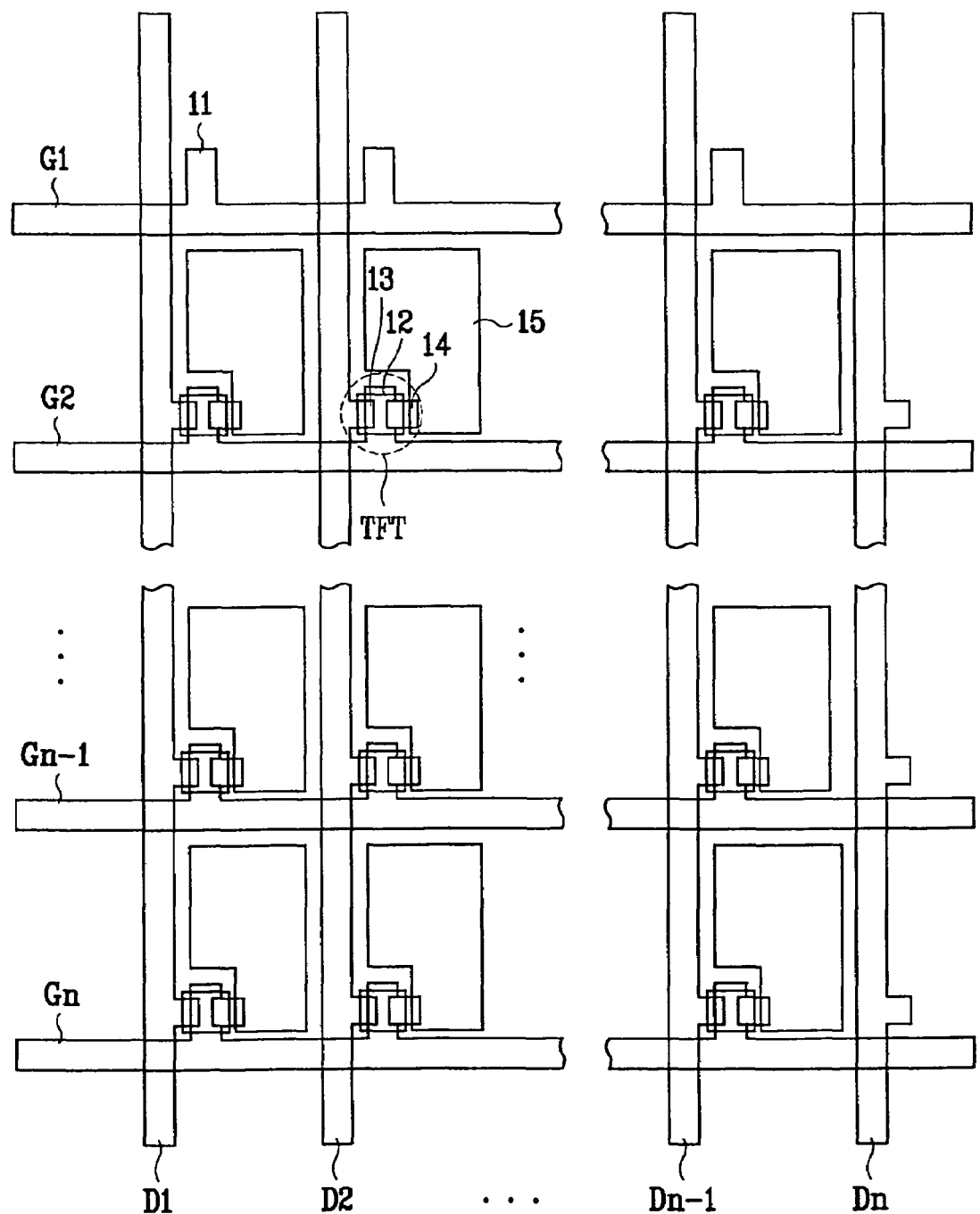
Figure 3:
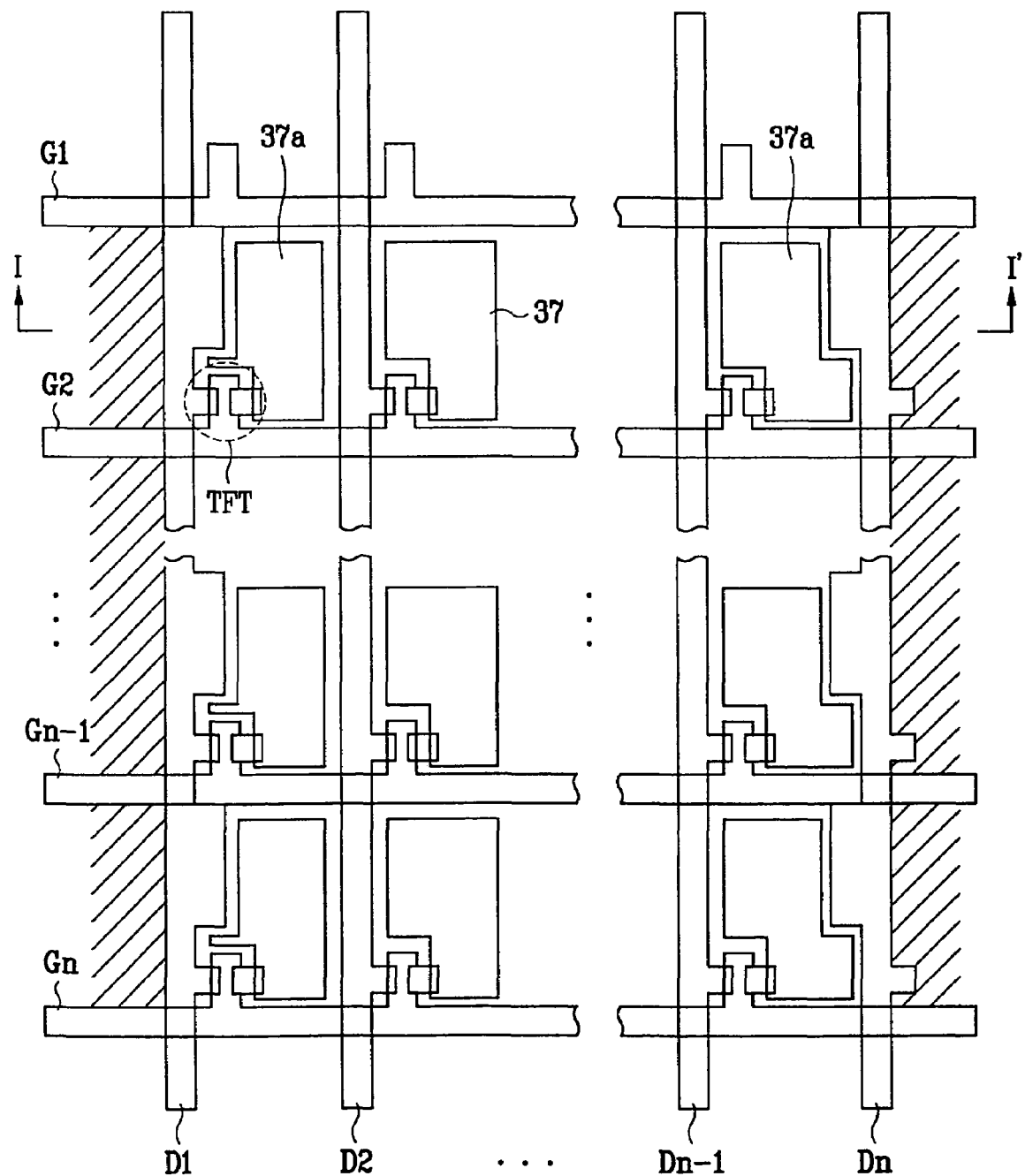
FIG. 3 is a plan view illustrating an LCD panel according to the first embodiment of the present invention.
Figure 4:
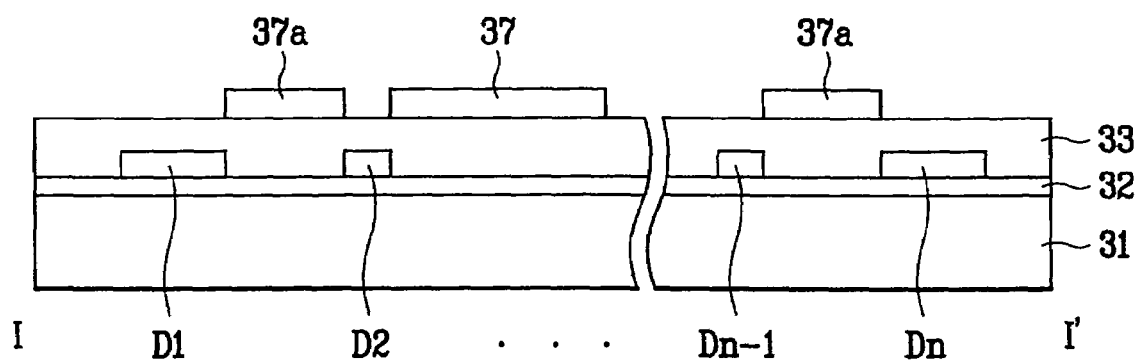
FIG. 4 is a sectional view taken along line I-I' of FIG. 3.

FIG. 3 is a plan view illustrating an LCD panel according to the first embodiment of the present invention. FIG. 4 is a sectional view taken along line I-I' of FIG. 3, in which relatively high luminance is removed by varying a width of data lines.

As shown in FIG. 3, a plurality of gate lines G1, G2, ..., ..., Gn are arranged in one direction and a plurality of data lines D1, D2, ..., Dn are arranged to cross the gate lines G1, G2, ..., Gn to define a plurality of pixel regions.

A plurality of TFTs are formed at each crossing point between the respective gate line and the respective data line. A plurality of pixel electrodes 37 are formed so that each pixel electrode is connected with a drain electrode of each respective TFT.

At least one of the first data line D1 and the last data line Dn has a portion that extends into the pixel region toward the pixel electrode 37. The other data lines D2, D3, ..., Dn-1 do not have such a portion. Therefore, the pixel electrodes 37a adjacent to the one of the first data line D1 and the last data line Dn have a smaller area than the pixel electrodes 37 adjacent the remaining data lines D2, ..., Dn-1. The smaller area of the pixel electrode 37a means reduction of an aperture ratio.

In FIG. 3, a shaded region indicates an oblique region where no pixel electrodes 37 and 37a are formed. Luminance is higher in the oblique region than in the regions where the pixel electrode is formed. For this reason, there is an uneven luminance distribution over the whole LCD panel.

To obtain even luminance distribution, a method is provided for reducing aperture ratio in a pixel electrode region adjacent to the oblique region. To this end, as shown in FIG. 3, portions of the first data line D1 and the last data line Dn are made to be wider than the other data lines D2, D3, ..., Dn-1, so that the aperture ratio in a corresponding region is reduced. At this time, the reduced aperture ratio is within the range of about 10~15% lower than the aperture ratio of the other pixel electrode regions.

FIG. 4 is a sectional view taken along line I-I' of FIG. 3. Referring to FIG. 4, the gate insulating film 32 is formed on the first substrate 31. The first data line D1 and the last. data line Dn have the greater widths than the other data lines D2, D3, ..., Dn-1 on the gate insulating film 32.

At this time, although not shown, a gate electrode of the TFT is formed on the first substrate 31. A semiconductor layer is formed on the gate insulating film 32 and is used as a channel of the TFT. Source and drain electrodes are formed on the semiconductor layer by the same process as the process for forming the data lines.

A passivation film 33 is formed on the entire surface including the data lines D1, D2, ..., Dn. Pixel electrodes 37 and 37a are formed on the passivation film 33. At this time, an area of the pixel electrode adjacent to the first data line D1 and the last data line Dn is smaller than areas of the other pixel electrodes because the area of the pixel electrode adjacent to the first data line D1 is by the area of the extended portion of the first data line.

The pixel electrode includes a transparent material such as ITO. The data line includes a metal material such as Al, Cr, Mo, Ta, and Al alloy. Accordingly, the pixel electrode 37a adjacent to the first data line D1, and the last data line Dn have less area than the other pixel electrodes 37 and the data lines D1 and Dn have larger widths, so that transmittivity of light irradiated from a back light (not shown) is reduced to reduce the aperture ratio.

Accordingly, relatively high luminance in the region where the pixel electrode is not formed is compensated by reducing the aperture ratio around the region, so that even luminance distribution can be obtained over the LCD panel as a whole.

Figure 5:
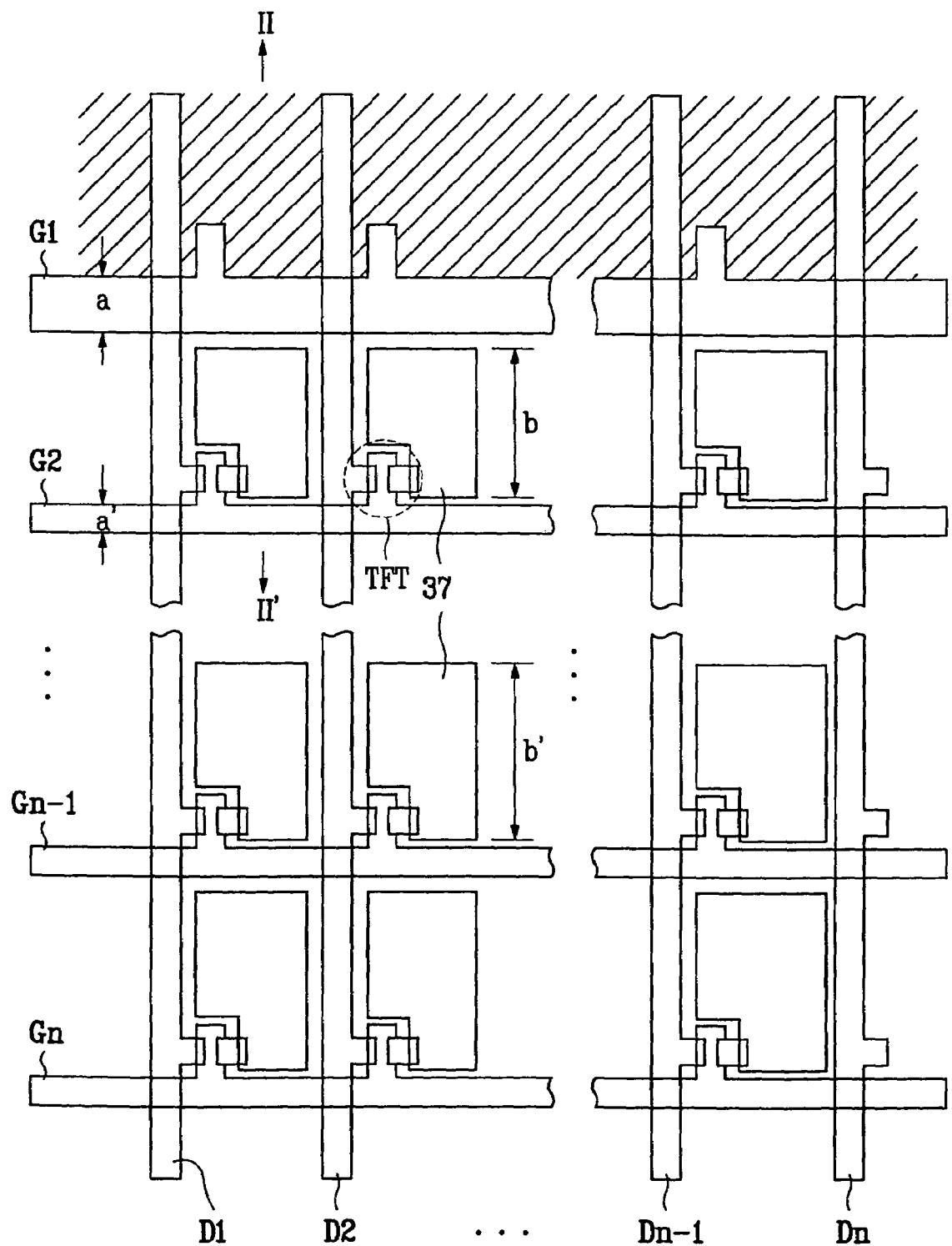
FIG. 5 is a plan view illustrating an LCD panel according to the second embodiment of the present invention.
Figure 6:
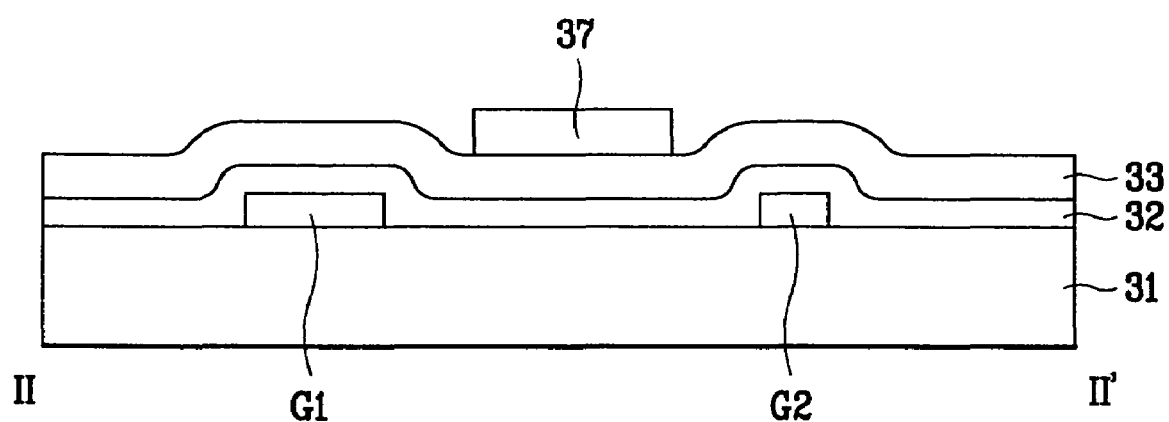
FIG. 6 is a sectional view taken along line II-II' of FIG. 5.

Meanwhile, FIG. 5 is a plan view illustrating an LCD panel according to the second embodiment of the present invention. FIG. 6 is a sectional view taken along line II-II' of FIG. 5.

In the LCD panel according to the second embodiment of the present invention, as shown in FIG. 5, the width of the first gate line that does not drive a pixel electrode is controlled to remove relatively high luminance in the region adjacent to the first data line, as indicated by the shading in FIG. 5 (oblique region). The width of the first gate line G1 is greater than the width of the other gate lines G2, G3, ..., Gn. Thus, the aperture ratio is reduced because of the decrease in area of the pixel region that is adjacent to the first gate line G1. At this time, the width of the gate line G1 is controlled so that the aperture ratio is reduced by the range of about 10~15%. In FIG. 5, the width a of the first gate line G1 is greater than the width of a' of the other gate lines G2, ..., Gn, i.e., a>a', and the width b of the pixel region adjacent to the first gate line G1 is less than the width b' of the other pixel regions, i.e. b<b'.

That is, a plurality of the gate lines G1, G2, ..., Gn are formed on the first substrate 31, and a gate insulating film 32 is formed on the entire surface including the gate lines. The data line D1 is formed to cross the gate lines.

The first gate line G1 of the gate lines G1, G2, ..., Gn is patterned to have a greater width than widths of the other gate lines G2, G3, ..., Gn.

Accordingly, the pixel electrode 37 has a relatively small area as compared to the other pixel regions because the width of the first gate line G1 is greater than the width of the other gate lines G2, ..., Gn. Thus, the aperture ratio is reduced by the decreased area of the pixel electrode.

As described above, in FIG. 3 and FIG. 4, to remove relatively high luminance occurring before the first data line and after the last data line, the first and last data lines D1 and Dn are patterned to have greater widths than the other data lines. In FIG. 5 and FIG. 6, to remove relatively high luminance occurring above the first gate line, the first gate line is patterned to have a greater width than the other gate lines.

Therefore, in the case where an LCD panel is formed based on FIG. 3 and FIG. 4, relatively high luminance occurring at the front end of the first gate and data lines and at the rear end of the last data line can be removed.

Figure 7:
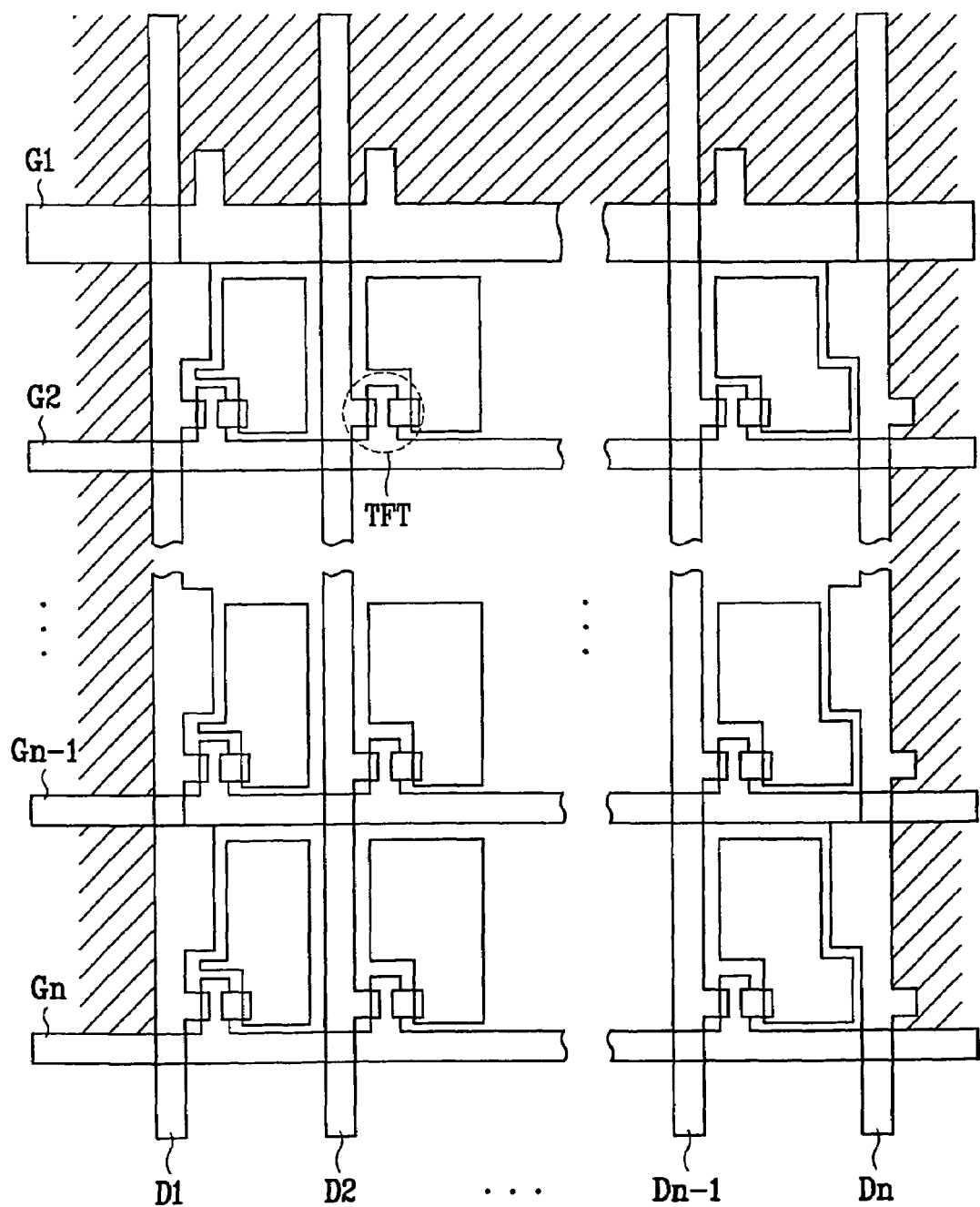
FIG. 7 is a plan view illustrating an LCD panel according to the third embodiment of the present invention.

FIG. 7 is a plan view illustrating an LCD panel according to the third embodiment of the present invention.

In the LCD panel according to the third embodiment of the present invention., as shown in FIG. 7, relatively high luminance occurring along the periphery of the LCD panel is removed by increasing the width of the first gate line and at the same time increasing the widths of the first data line D1 and the last data line Dn.

As described above, the aperture ratio of the pixel region adjacent to the first data line D1 and the last data line Dn is reduced by increasing the widths of the first data line D1 and the last data line Dn. At the same time, the aperture ratio of the pixel region adjacent to the first gate line G1 is reduced by increasing the width of the first gate line G1. Thus, relatively high luminance occurring in the oblique region (indicated by shading in FIG. 7) is removed.

While relatively high luminance has been removed by controlling the widths of the gate line and the data line, the relatively high luminance may be removed by controlling the width of a black matrix pattern formed on a second substrate.

Figure 8:
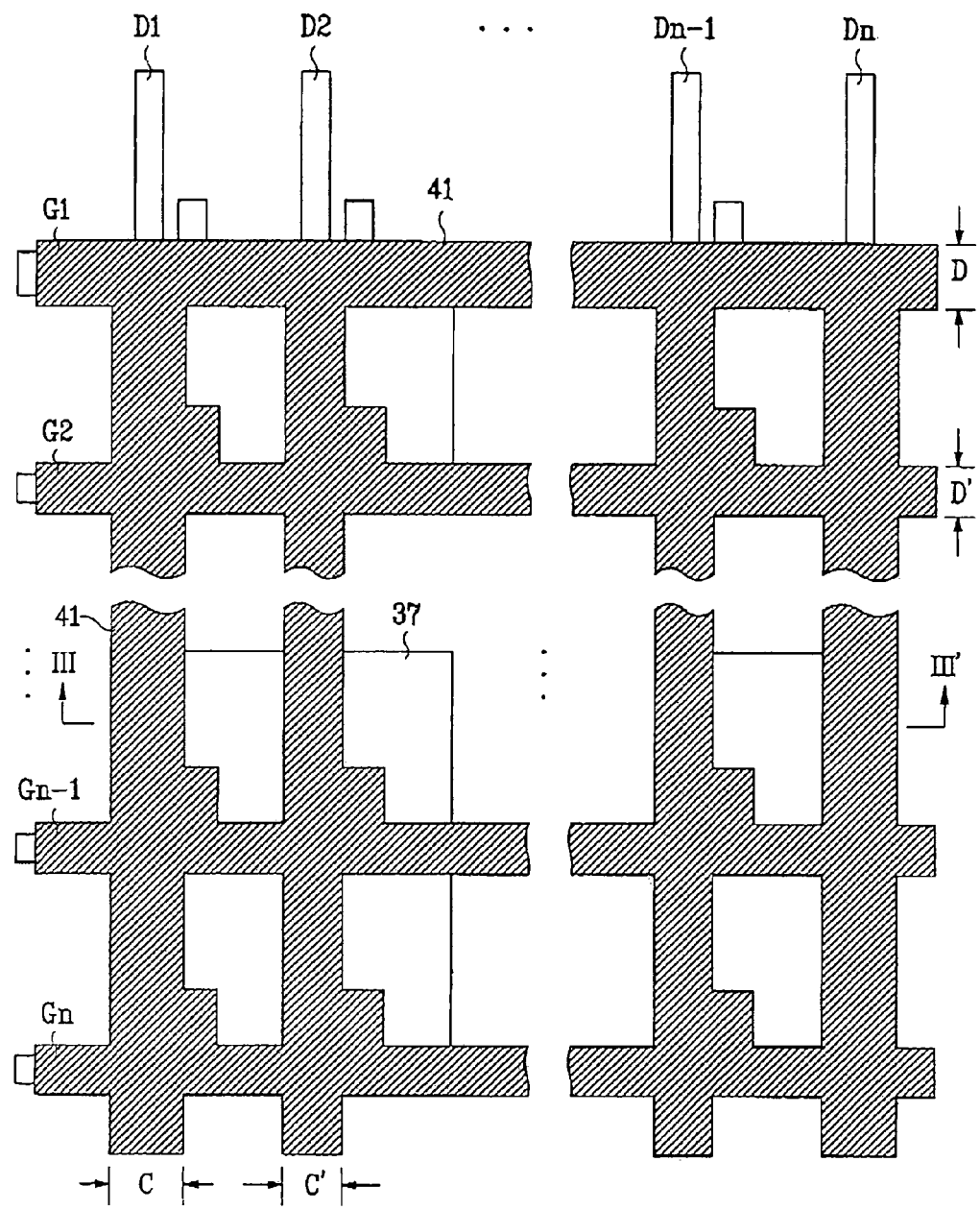
FIG. 8 is a plan view illustrating an LCD panel according to the fourth embodiment of the present invention.

FIG. 8 is a plan view illustrating an LCD panel according to the fourth embodiment of the present invention.

In the LCD panel according to the fourth embodiment of the present invention, as shown in FIG. 8, the black matrix pattern 41 on the second substrate 31a, which corresponds to the first gate line G1 formed on the first substrate 31, the first data line D1 and the last data line Dn, is patterned to be wider than the other regions. Thus, the aperture ratio of the pixel region adjacent to the first gate line G1, the first data line D1 and the last data line Dn is reduced. The width C of portions of the black matrix over the first and last data lines D1 and Dn is greater than the width C' of other portions of the black matrix over the other data lines. (see C>C' in the drawing). The width D of a portion of the black matrix over the first gate line G1 is greater than the width D1 of portions of the black matrix over the other gate lines G2 . . . Gn, i.e. D>D'. Thus the reduction in aperture ratio is within the range of about 10~15%.

Figure 9:
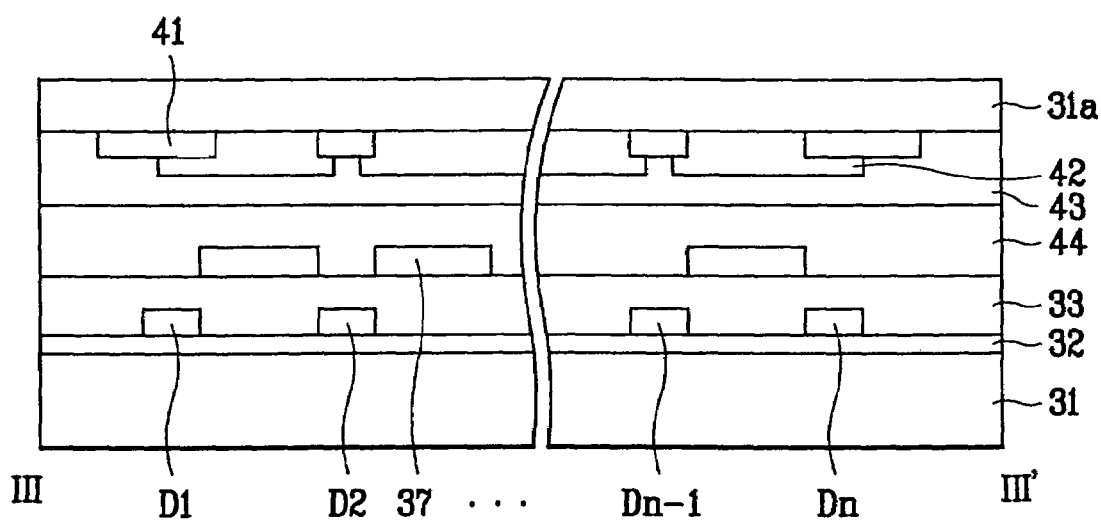
FIG. 9 is a sectional view taken along line III-III' of FIG. 8.

In other words, as shown in FIG. 9, the black matrix pattern 41 on the second substrate 31a corresponding to the first data line D1 and the last data line Dn is patterned to be wider than the other regions.

As described above, in this embodiment the width of the black matrix pattern 41 formed on the second substrate 31a is controlled, while the widths of the gate and data lines are maintained as they are. Thus, the aperture ratio of the pixel electrode region adjacent to a region where the pixel electrode is not formed, is reduced, thereby removing relatively high luminance occurring in the region where the pixel electrode is not formed.

In FIG. 9 reference numeral "42," which is not described, denotes a color filter pattern that displays colors. Reference numeral "43" denotes a common electrode for applying a voltage to a liquid crystal layer 44 together with the pixel electrode 37.

Meanwhile, in addition to the method for controlling the width of the black matrix pattern, a light-shielding pattern that can reduce the aperture ratio may be formed in the pixel region adjacent to the region where the relatively high luminance occurs.

Figure 10:
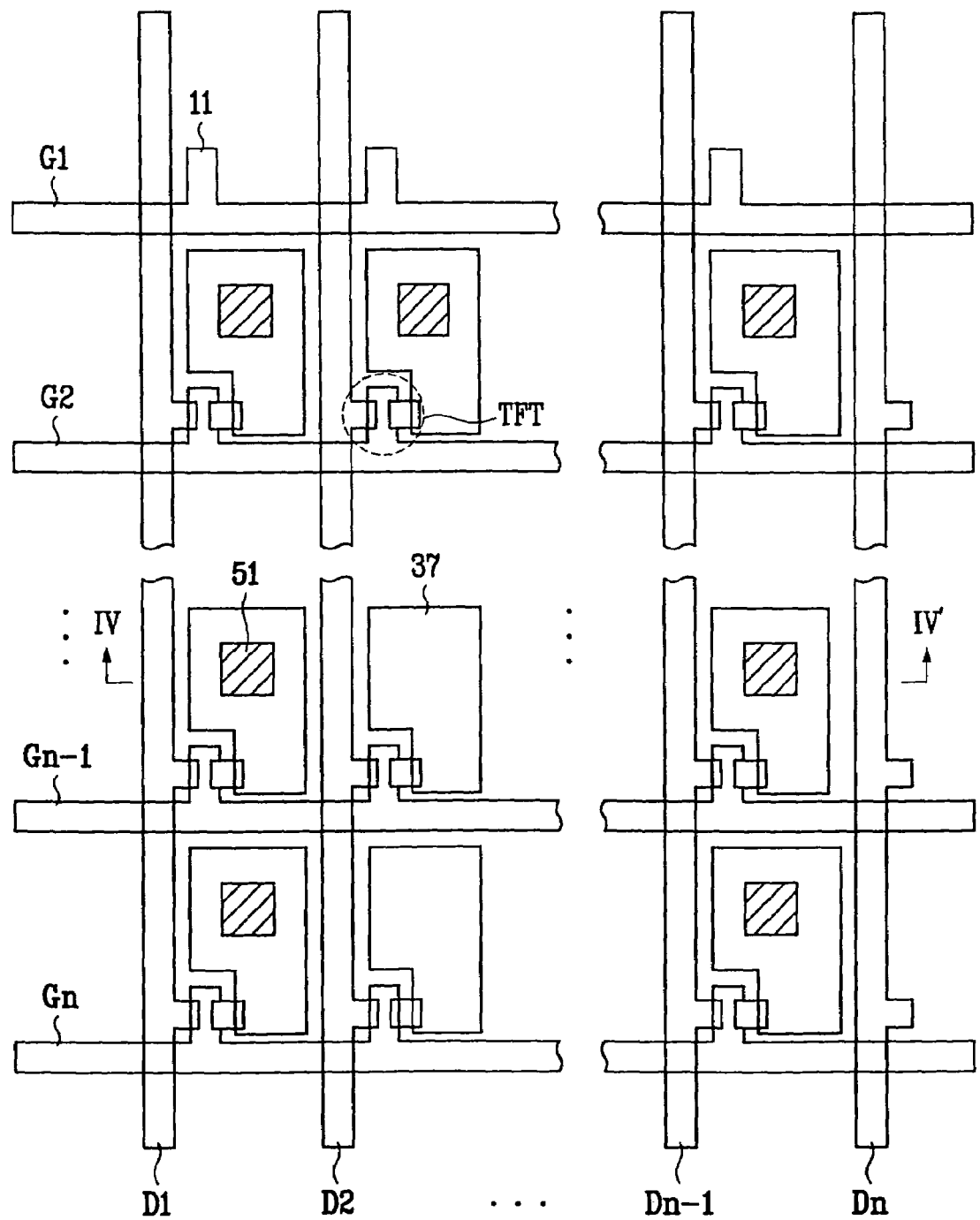
FIG. 10 is a plan view illustrating an LCD panel according to the fifth embodiment of the present invention.
Figure 11:
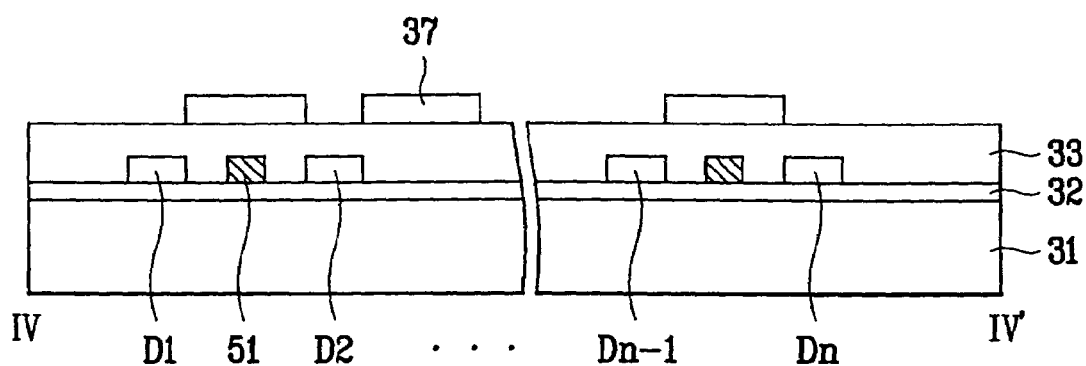
FIG. 11 is a sectional view taken along line IV-IV' of FIG. 10.

FIG. 10 is a plan view illustrating an LCD panel according to the fifth embodiment of the present invention. FIG. 11 is a sectional view taken along line IV-IV' of FIG. 10.

In other words, in the LCD panel according to the fifth embodiment of the present invention, as shown in FIG. 10 and FIG. 11, a plurality of gate lines G1, G2, . . . , Gn are arranged to cross a plurality of data lines D1, D2, . . . , Dn so that a plurality of pixel regions are defined. A thin film transistor (TFT) is formed at each crossing point of the respective gate line and the respective data line. A light-shielding pattern 51 is formed in the pixel region adjacent to the first gate line G1, the first data line D1 and the last data line Dn. A pixel electrode 37 is formed in each pixel region.

In other words, the light-shielding pattern 51 is formed in the pixel region adjacent to the region where relatively high luminance occurs, so that the aperture ratio is reduced by about 10~15%. As a result, an even LCD panel having no relatively high luminance can be obtained.

The light-shielding pattern 51 is formed of the same material as that of the gate line when the gate line is formed. Alternatively, the light-shielding pattern 51 may be formed of the same material as that of the data line when the data line is formed.

As described above, the LCD panel of the present invention has the following advantages.

The relatively high luminance occurring in the region where the pixel electrode is not formed is removed by reducing the aperture ratio of the pixel region adjacent to the high luminance region, which results in the same transmittivity over the LCD panel as a whole. As a result, even luminance distribution having no relatively high luminance can be obtained, thereby providing an LCD panel having high picture quality.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A liquid crystal display panel comprising:
a first substrate provided with a plurality of gate and data lines, the gate lines being arranged to cross the data lines to define a plurality of active pixel regions in a matrix arrangement;
a second substrate provided with a black matrix layer to shield portions other than the active pixel regions from light, wherein the black matrix surrounds and is adjacent to each active pixel region, and
a liquid crystal layer injected between the first and second substrates, wherein the active pixel regions in a peripheral portion of the matrix arrangement have an aperture ratio lower than that of the active pixel regions in other portions of the matrix arrangement,
wherein the black matrix layer corresponding to a first gate line, a first data line and a last data line extend into the active pixel region toward a pixel electrode and have a greater width than widths of the black matrix layer corresponding to the other portions, and the first gate line among the gate lines a greater than width of the other gate lines so as to allow the active pixel regions in the peripheral portion to obtain an aperture ratio lower than that of the active pixel regions in the other portions.

2. The liquid crystal display panel of claim 1, wherein an aperture ratio of the active pixel regions in the peripheral portion is about 10~15% lower than aperture ratios of the active pixel regions at the other portions.

3. A liquid crystal display panel, comprising:
a first substrate provided with a plurality of gate and data lines, the gate lines being arranged to cross the data lines to define a plurality of active pixel regions in a matrix arrangement;
a second substrate provided with a black matrix layer to shield portions other than the active pixel regions from light, wherein the black matrix surrounds and is adjacent to each active pixel region, and a liquid crystal display layer injected between the first and second substrates, wherein portions of the black matrix layer corresponding to a first data line and a last data line among the data lines extend into the active pixel region toward a pixel electrode and have a greater width than portions of the black matrix layer corresponding to other data lines and partially shielding active pixel regions, and the first gate line among the gate lines a greater than width of the other gate lines, so that the active pixel regions in a peripheral portion of the matrix arrangement have an aperture ratio lower than that of the active pixel regions in other portions of the matrix arrangement.

4. A liquid crystal display panel comprising:

a first substrate provided with a plurality of gate and data lines, the gate lines being arranged to cross the data lines to define a plurality of active pixel regions in a matrix arrangement;

a second substrate provided with a black matrix layer to shield portions other than the active pixel regions from light, and a liquid crystal display layer injected between the first and second substrates, wherein a portion of the black matrix layer corresponding to a first gate line and a first data line extend into the active pixel region toward a pixel electrode and have a greater width than portions of a the black matrix layer corresponding to other gate lines and data lines, and the first gate line among the gate lines a greater than width of the other gate lines, so that the active pixel regions in a peripheral portion of the matrix arrangement have an aperture ratio lower than that of the active pixel regions in other portions of the matrix arrangement.

* * * * *